United States Patent [19]
Wiegand

[11] 3,828,624
[45] Aug. 13, 1974

[54] ACTUATOR ASSEMBLY
[75] Inventor: Hans Wiegand, Boyertown, Pa.
[73] Assignee: Teleflex Incorporated, North Wales, Pa.
[22] Filed: Nov. 24, 1971
[21] Appl. No.: 201,731

[52] U.S. Cl.................... 74/501 R, 74/504, 74/506
[51] Int. Cl. ............................................ F16c 1/18
[58] Field of Search................. 74/501 R, 504; 64/2

[56] References Cited
UNITED STATES PATENTS

| 3,258,989 | 7/1966 | Frese et al. ........................ | 74/501 R |
| 3,499,346 | 3/1970 | Ishida et al........................ | 74/501 R |
| 3,550,469 | 12/1970 | Morse ............................... | 74/501 R |
| 3,633,437 | 1/1972 | Ishida............................. | 74/501 R X |

FOREIGN PATENTS OR APPLICATIONS

| 1,018,031 | 12/1952 | France.............................. | 74/501 R |

Primary Examiner—Samuel Scott
Assistant Examiner—F. D. Shoemaker
Attorney, Agent, or Firm—McGlynn and Milton

[57] ABSTRACT

An actuator assembly of the type for moving a flexible transmitting core element in a curved path including a housing comprising a plastic half covered by a metal plate. The plastic half has a circular cavity for receiving a circular drive wheel which has a groove circumferentially thereabout for receiving the core element. The plastic half has a pocket and a plastic bushing is disposed in the pocket. A rod extends through the housing through the plastic bushing and through an arcuate slot in the circular drive wheel and into threaded engagement with the metal half of the housing whereby upon rotation of the rod the bushing is urged into frictional sliding engagement with the circular drive wheel for controlling the rotation thereof or to act as a brake. The housing also has a channel extending therethrough across the top and a core guide disposed in the channel. The channel has an enlarged portion adjacent each end and the guide includes a shoulder disposed in one of the enlarged portions. An insert is disposed at the other end of the channel and has a shoulder at the end thereof which is in abutting engagement with the other end of the guide, the insert and guide having passages therethrough through which a core element extends to engage the peripheral groove in the circular drive member.

22 Claims, 6 Drawing Figures

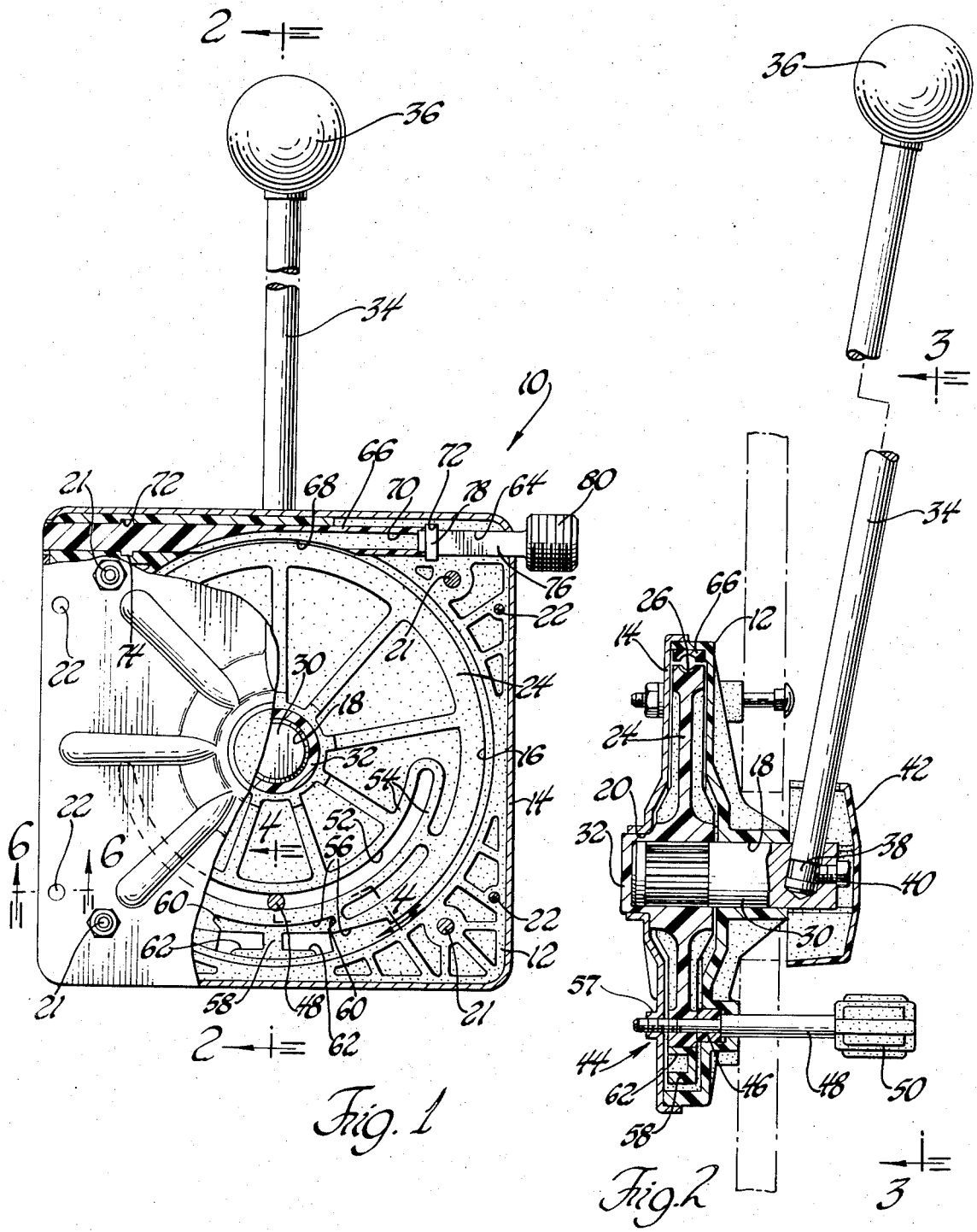

PATENTED AUG 13 1974 3,828,624

INVENTOR.
Hans Wiegand
BY
Barnard, McGlynn & Reising
ATTORNEYS

ACTUATOR ASSEMBLY

This invention relates to an actuator assembly of the type for longitudinally moving a flexible motion transmitting core element to transmit motion in a curved path. More specifically, the invention relates to such an assembly utilized in a marine steering control system for steering the arm or tiller of a rudder or an outboard motor mounted at the stern of the boat.

The actuator assembly of the instant invention is of the type utilized with a multi-stranded flexible core element or cable which includes a plurality of strands of wire wound together on a long lead with a projecting helix of uniform pitch and a short lead wound on the exterior of the strands. The actuator utilizes a circular rotary drive means or gear wheel having a groove extending circumferentially about the periphery thereof with recesses in the groove for receiving the helical projection, or said another way, teeth are defined between the recesses for engaging the sides of the helical wire of the core element. An example of a prior art assembly utilizing a circular drive wheel coacting with a core element having a helical wire is shown in U.S. Pat. No. 2,890,593. An example of a similar assembly suitable for use in a marine steering system is shown in U.S. Pat. No. 3,550,469.

It is an object and feature of this invention to provide an improved actuator assembly of this type which is simple in construction and versatile in use.

In correlation with the foregoing object and feature, another object and feature of this invention is to provide an actuator assembly having a rotary drive means rotatably supported in a housing and with a novel friction means comprising a bushing urged into frictional engagement with the drive means.

In correlation with the foregoing objects and features, it is another object and feature of this invention to provide a rotary actuator assembly with a channel extending through the housing with a guide disposed in the channel for guiding the core element into engagement with the rotary drive means and with the guide having an arcuate recess adjacent the rotary guide means and a passage extending from the first end thereof to the arcuate recess with the channel having enlarged pockets at the ends thereof with the guide having a shoulder adjacent the second end and disposed in one pocket with an insert disposed in the channel at the opposite end and having a terminal end with a shoulder abutting the first end of the guide and disposed in the other pocket.

In correlation with the foregoing objects and features, it is another object and feature of this invention to provide such an assembly wherein the housing means comprises two halves, the first of which is made of plastic having a circular cavity therein for receiving the rotary drive means and the second half of a metal plate covering the cavity.

In correlation with the foregoing objects and features, it is another object and feature of this invention to provide such an actuator assembly wherein a retainer is attached to the circumference of the rotary drive means and has cavities extending thereinto from opposite directions whereby the retainer may receive the end of a cable from either direction.

Other objects and attendant advantages of the present invention will be readily appreciated as the same becomes better understood by reference to the following detailed description when considered in connection with the accompanying drawings wherein:

FIG. 1 is a side view partially broken away and in cross-section of a preferred embodiment of the instant invention;

FIG. 2 is a cross-sectional view taken substantially along line 2—2 of FIG. 1;

An actuator assembly of the type for moving a flexible motion transmitting core element in a curved path constructed in accordance with the instant invention is generally shown at 10. As mentioned hereinabove the core element with which the instant invention is adapted to cooperate is one comprising a plurality of strands of wire wound together on a long lead and with another wire wound thereabout in a short lead or pitch so as to define teeth which will coact with recesses in a groove in a rotary drive member. (Such a core element being shown in the above-mentioned patents).

Figure 3:
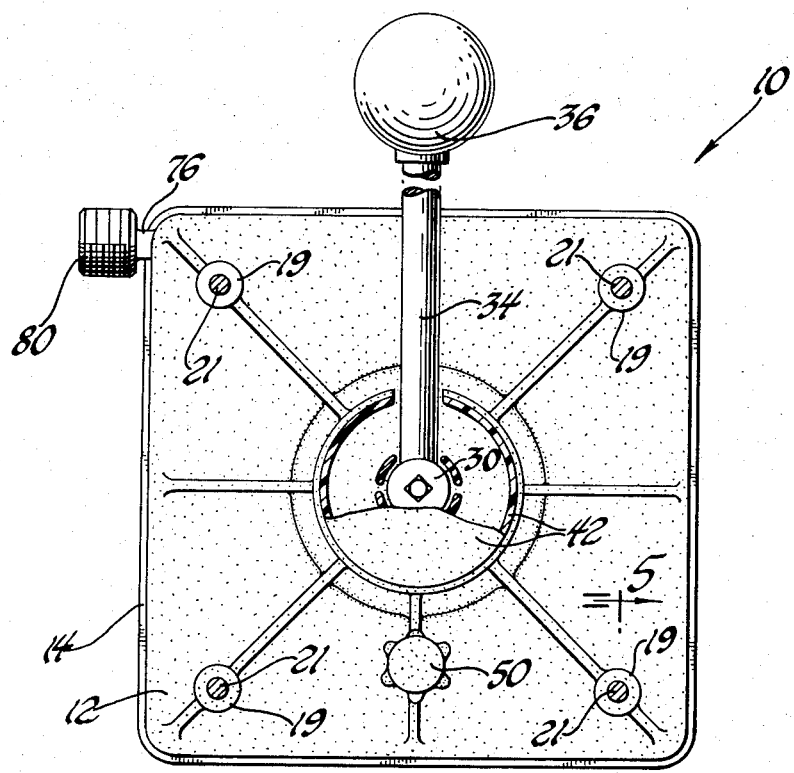
FIG. 3 is a view taken substantially along line 3—3 of FIG. 2 and partially broken away and in cross-section.
Figure 4:
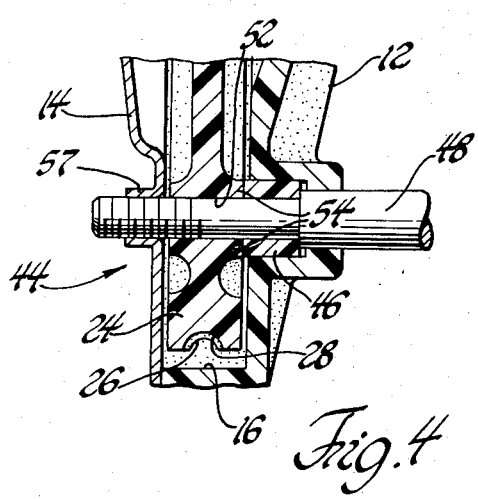
FIG. 4 is a cross-sectional taken substantially along line 4—4 of FIG. 1.
Figure 5:
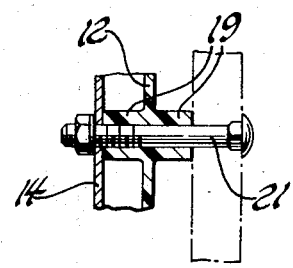
FIG. 5 is a fragmentary cross-sectional view taken substantially along line 5—5 of FIG. 3.
Figure 6:
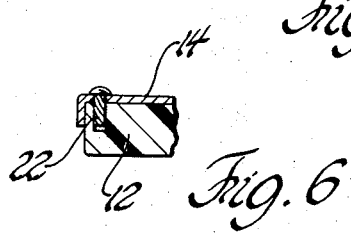
FIG. 6 is a fragmentary cross-sectional view taken substantially along line 6—6 of FIG. 1.

The assembly includes a housing means comprising the first half 12 and the second half 14. The first half 12 is preferably made of a high impact resistant nylon although it may be made of other suitable plastics. The second half of the housing 14 is preferably made of metal. As is evident from the drawings, the housing is generally square in configuration and the metal plate 14 adds rigidity to the housing. The first half 12 of the housing includes a circular pocket 16. The first half 12 of the housing also includes a shaft support cylinder 18 and the second half or plate 14 of the housing includes a shaft support flange 20. The plastic half 12 of the housing also includes various ribs and pockets. The metal plate 14 may be secured or attached to the plastic housing 12 by many devices; however, as illustrated in FIG. 6, pins 22 are utilized and are inserted through holes in the plate 14 and forced into holes in the plastic member 12. The first half of the housing 12 has bosses 19 through which bolts 21 extend for securing the assembly to a bulkhead such as shown in phantom in FIGS. 2 and 5.

The assembly also includes a rotary drive means comprising the circular drive wheel 24 which is rotatably supported in the housing means and adapted to receive a motion transmitting core element. The circular drive wheel 24 is adapted to receive a motion transmitting core element by having a peripheral groove 26 extending circularly thereabout for receiving the core element. As alluded to hereinabove, the groove 26 is arcuate and includes spaced recesses 28 for receiving the spaced convolutions of the helical wire. The circular drive wheel 24 is preferably made of a glass filled plastic such as that sold under the tradename ZYTEL.

A shaft 30 is rotatably supported in the shaft support cylinder 18 of the first housing half 12 and is in mechanical driving engagement with the circular wheel 24. The circular wheel 24 has an end portion 32 molded about the end of the shaft 30 and rotatably supported in the support flange 20 of the metal plate 14.

A lever 34 having a ball 36 at the distal end thereof extends generally radially, although at an angle as viewed in FIG. 2, from the shaft 30 exteriorly of the housing means for rotating the shaft 30 to in turn rotate the circular drive wheel 24. The lower end of the shaft 34 has a groove 38 therein and a bolt 40 threadedly engages the end of the shaft 30 with its end disposed in the groove 38 in the end of the lever 34 for retaining the lever 34 to the shaft 30. A plastic cap 42 is disposed about the end of the shaft 30 and about the lower portion of the lever 34.

The assembly 10 also includes a friction means generally shown at 44 for controlling rotary movement of the circular drive wheel 24. The first half of the housing 12 has a pocket therein in which the bushing 46 is disposed. The friction means 44 also includes adjustment means comprising the rod 48 and knob 50 for adjusting the force utilized to urge the bushing 46 into the frictional engagement with the circular drive member 24. The circular drive wheel 24 includes an arcuate slot 52 with ridges or banks along each side of the slot and the end of the cylindrical bushing 46 is urged into abutting engagement with the ridges 54. The rod has a shoulder abutting the outward face or end of the bushing 46 and extends through the bushing 46 and through the slot 52 and into threaded engagement with the second half 14 of the housing. The housing half 14 includes a circular flange 57 which is threaded to threadedly receive the threaded end of the rod 48. The knob 50 is disposed on the end of the rod 48 for rotating the rod 48.

As will be appreciated, rotation of the rod 48 controls the force by which the bushing 46 is urged against the ridges 54, thus controlling the frictional resistance to the rotation of the circular drive wheel 24 and if the rod 48 is tightened enough, the circular wheel 24 may be prevented from rotating.

The drive wheel 24 has a recess 56 in the periphery thereof and a retainer 58 is disposed therein for retaining the end of a motion transmitting core element. The retainer is preferably made of an acetal resin and is therefore of a different plastic than the circular wheel 24. The retainer 58 has tongues 60 at each end thereof which coact with grooves in the pocket 56 thereby securing the retainer to the circular drive member 24. In other words, the retainer is in frictional engagement with the circular drive wheel 24 by way of tongues and grooves and is prevented from moving radially outwardly by such tongues and grooves. The retainer has cavities 62 extending thereinto from opposite directions whereby the retainer may receive the end of a core element from either direction, although as will be clear hereinafter, the way the assembly is put together and shown in FIG. 1, the end of the core element would be disposed in the cavity 62 on the left side of the assembly as viewed in FIG. 1.

The half 12 of the housing includes a three-sided channel 64 extending thereacross. A core element guide 66 is disposed in the channel for guiding the core element into the peripheral groove 46 in the circular drive wheel 24. The guide member 66 is generally square in cross section thereby being contiguous with and filling the channel 64. The guide has an arcuate recess 68 contiguous with the periphery of the circular drive member 24. A passage 70 extends from a first end of the guide 66 and into communication with the arcuate recess 68.

Channel 64 has an enlarged pocket 72 adjacent each end thereof. The guide 66 has a shoulder 74 adjacent the second end thereof and disposed in one of the pockets 72. The guide 66 is also preferably made of a high impact resistant nylon.

There is also included a metal insert 76 also having a square cross section and disposed in the channel 64. The insert has a shoulder 78 at the inward end thereof which abuts the first end of the guide 66 and which is disposed in the other enlarged pocket 72. As seen in the drawings, the first end of the guide 66 is recessed and a portion of the insert 76 extends into the recessed portion in the end of the guide 66. The insert 76 extends exteriorly of the housing and has a passage therethrough and in communication with the passage 70 in the guide 66 so that a core element may extend through the passages and into the groove 26 in the circular drive member 24. The outward end of the insert 76 has a threaded end 80 whereby a guide conduit may be attached thereto for guiding and supporting the motion transmitting core element.

As will be appreciated, the positions of the guide 66 and the insert 76 may be reversed so that the insert 76 extends from the opposite end of the channel 64 whereby the core element may be inserted from the opposite direction. In other words, the entire assembly is reversible. Thus, depending upon in which direction the core element is inserted into the assembly, its end will be disposed in the appropriate cavity 62 in the retainer 58.

The operation of the assembly is clear from the drawings in that the knob 36 is grasped to pivot the lever 34 thereby rotating the shaft 30 which in turn rotates the circular drive wheel 24 thereby longitudinally moving the motion transmitting core element disposed in the peripheral groove thereof. To provide a resistance to such rotary movement of the circular drive wheel 24 the knob 50 may be rotated to rotate the shaft 48 to in turn urge the bushing 46 into more or a higher degree of frictional engagement with the ridges 54. If the rod 48 is rotated enough rotation of the circular drive wheel 24 may be prevented at any selected rotary position. The arcuate slot 52 in which the rod 48 is disposed allows rotary movement of the circular drive gear 24 between limits as defined by the ends of the arcuate slot 52.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An actuator assembly of the type for moving a flexible motion transmitting core element in a curved path, said assembly comprising; housing means; a rotary drive means rotatably supported in said housing means and adapted to receive a motion transmitting core element; and friction means for controlling rotary movement of said rotary drive means, said friction means including a bushing in frictional engagement with said rotary drive means, adjustment means for adjusting the force utilized to urge said bushing into said frictional engagement with said rotary drive means, said rotary drive means including an arcuate slot with ridges along either side, said bushing being in abutting engagement with said ridges, said adjustment means including a rod having a shoulder abutting the bushing and extending through said bushing and through said slot and into threaded engagement with threads supported by said housing.

2. An assembly as set forth in claim 1 wherein said adjustement means further includes a knob disposed on the end of said rod for rotating said rod.

3. An assembly as set forth in claim 2 wherein said housing means comprises first and second halves, said first half having a pocket therein in which said bushing is disposed.

4. An assembly as set forth in claim 3 wherein said first half is made of plastic and said second half is made of metal.

5. An assembly as set forth in claim 3 including a retainer on said rotary drive means for retaining the end of a motion transmitting core element.

6. An assembly as set forth in claim 5 wherein said retainer is attached to said rotary drive means by tongues and grooves.

7. An assembly as set forth in claim 6 wherein said rotary drive means is made of a plastic different from that of said retainer.

8. An assembly as set forth in claim 6 wherein said rotary drive means is circular and has a peripheral groove extending thereabout for receiving a motion transmitting core element.

9. An assembly as set forth in claim 8 a shaft rotatably supported in said housing, said circular rotary drive means being supported on said shaft.

10. An assembly as set forth in claim 9 a lever extending generally radially from said shaft exteriorly of said housing means for rotating said shaft to rotate said circular drive means.

11. An assembly as set forth in claim 10 including a cap disposed about the end of said shaft and about a portion of said lever.

12. An assembly as set forth in claim 10 wherein said first half of said housing includes a channel extending thereacross, a core element guide disposed in said channel for guiding a core element into the groove in said circular drive means, said guide having an arcuate recess contiguous with the periphery of said circular drive means and a passage extending from a first end thereof to said arcuate recess, said channel having an enlarged pocket adjacent each end thereof, said guide having a shoulder adjacent the second end thereof and disposed in one of said enlarged pockets, an insert disposed in said channel with one end thereof having a shoulder abutting the first end of said guide and disposed in the other enlarged pocket, said insert extending exteriorly of said housing and having a passage therethrough and in communication with said passage in said guide so that a core element may extend through said passages and into said groove in said circular drive means.

13. An assembly as set forth in claim 12 wherein said channel is three sided and said guide and said insert are square in cross section.

14. An assembly as set forth in claim 13 wherein said guide is made of plastic and said insert is made of metal.

15. An assembly as set forth in claim 14 wherein said retainer has cavities extending thereinto from opposite directions so that the end of the core element may extend thereinto from either direction.

16. An actuator assembly of the type for moving a flexible motion transmitting core element in a curved path, said assembly comprising; housing means, rotary drive means rotatably supported in said housing means, said housing means having a channel extending therethrough, a guide disposed in said channel for guiding a core element into engagement with said rotary drive means, said guide having an arcuate recess adjacent said rotary drive means and a passage extending from a first end thereof to said arcuate recess, said channel having an enlarged pocket adjacent each end thereof, said guide having a shoulder adjacent the second end thereof and disposed in said pocket, an insert disposed in said channel with one end thereof having a shoulder abutting the first end of said guide and disposed in the other enlarged pocket.

17. An assembly as set forth in claim 16 wherein said insert extends exteriorly of said housing means and includes a passage therethrough and in communication with said passage in said guide so that a core element may extend through said passages and into said groove in said circular drive means.

18. An assembly as set forth in claim 17 wherein said channel is three sided and said guide and said insert are square in cross section.

19. An assembly as set forth in claim 18 wherein said guide is made of plastic and said insert is made of metal.

20. An assembly as set forth in claim 19 wherein the outer end of said insert is threaded.

21. An actuator assembly of the type for moving a flexible motion transmitting core element in a curved path, said assembly comprising: housing means, rotary drive means rotatably supported in said housing means, said drive means having a peripheral groove for receiving a core element, a retainer attached to said drive means and having cavities extending thereinto from opposite directions for receiving the end of a core element from either direction, said retainer including a bulkhead dividing said cavities from one another for abutting the end of the core element.

22. An assembly as set forth in claim 21 wherein said retainer is attached to said rotary drive means by tongues and grooves.

* * * * *